UNITED STATES PATENT OFFICE 2,274,568

CELLULOSE DERIVATIVE COMPOSITIONS

Byron M. Vanderbilt, Roselle Park, N. J., assignor to Commercial Solvents Corporation, Terre Haute, Ind., a corporation of Maryland No Drawing. Application May 29, 1939,
Serial No. 276,421

5 Claims. (Cl. 106—181)

My invention relates to cellulosic compositions which contain esters of phthalic acid. More particularly, it relates to cellulose ester compositons having incorporated therein phthalates of nitroalcohols.

Cellulose esters and ethers such as nitrocellulose, cellulose acetate, ethyl cellulose, and the like, which are commonly used in the production of lacquers, plastics, and photographic films, have a tendency to become brittle in the absencse of a suitable plasticizer or softener, and if subjected to slight flexure or torsion, are inclined to chip and crack. In order to overcome this defect, and to produce cellulosic compositions possessing permanent flexibility, the incorporation of a plasticizer has been common practice, and numerous materials have been suggested for this purpose.

Materials which are in general satisfactory plasticizers must be relatively high boiling compounds, and must be capable of imparting extensibility and flexibility to the material which is to be plasticized. Also, the plasticizer should be capable of forming a homogeneous mass when in combination with the cellulose derivative, and the resulting product should be both water resistant and heat resistant. For use in molded plastics, and especially for injection molding, the plasticizer should have the property of promoting flow at elevated temperatures as well as imparting flexibility at atmospheric temperatures. Plasticizers which have this flow-promoting propertly at elevated temperatures without unduly softening the plastic at atmospheric temperatures, are often referred to as "hardening agents."

I have now discovered that cellulose derivatives, e. g., the cellulose esters and ethers of plastic and coating composition grades, and in particular, nitrocellulose, cellulose acetate, cellulose acetopropriate, cellulose acetobutyrate, and ethyl cellulose may be satisfactorily plasticized by means of nitroalcohol esters of phthalic acid having the following structural formula:

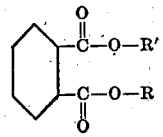

in which R' is an aliphatic nitrohydrocarbon radical and R is chosen from the group consisting of aliphatic hydocarbon radicals and aliphatic nitrohydrocarbon radicals. Among these compounds I prefer to employ those of the following structural formula:

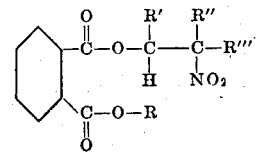

in which R' is chosen from the group consisting of hydrogen and alkyl, R" and R''' are chosen from the group consisting of hydrogen, alkyl and cycloalkyl, and R is chosen from the group consisting of alkyl and cycloalkyl. In general, I prefer to employ compounds in which both of the radicals R and R' in the first formula given above contain less than six carbon atoms, but it is to be understood that the compounds of higher molecular weight are also useful in cellulose derivative compositions.

As examples of nitroalcohol esters of phthalic acid included in my invention may be mentioned 2-nitroethyl phthalate, methyl 2-nitroethyl phthalate, ethyl 2-nitroethyl phthalate, butyl 2-nitroethyl phthalate, cyclohexyl 2-nitroethyl phthalate, 2-nitropropyl phthalate, methyl 2-nitropropyl phthalate, ethyl 2-nitropropyl phthalate, butyl 2-nitropropyl phthalate, 2-methyl-2-nitropropyl phthalate, methyl 2-methyl-2-nitropropyl phthalate, ethyl 2-methyl-2-nitropropyl phthalate, butyl 2-methyl-2-nitropropyl phthalate, 2-methyl-2-nitrobutyl phthalate, methyl 2 - methyl - 2 - nitrobutyl phthalate, ethyl 2-methyl-2-nitrobutyl phthalate, methyl (1-nitrocyclohexyl)methyl phthalate, and ethyl (1-nitrocyclohexyl)-methyl phthalate.

The phthalates of the nitroalcohols, referred to above, may be prepared by any suitable method for the production of phthalic acid esters. Thus, a convenient method for the production of the mixed phthalates is the following: The nitroalcohol, in molecular excess, is reacted with phthalic anhydride in the presence of an acid catalyst, after which the mixture is allowed to stand for 24–72 hours at a temperature not substantially above 100° C. The acid phthalate obtained thereby may be separated from the unreacted nitroalcohol by a suitable procedure, such as, for example, by means of a selective solvent for the nitroalcohol. The resulting acid phthalate may then be reacted in an acid solution with an aliphatic alcohol, which is present in excess throughout the reaction. The above procedure may be found to be described in detail in my copending U. S. Ser. No. 206,190, filed May 5, 1938.

My new plasticizers are particularly suited for use in molding compositions, and meet the usual requirements for a plasticizer for this purpose. Thus, cellulose ester compositions containing my new plasticizers do not sweat or whiten on standing when exposed to temperatures as low as $-22°$ C. for relatively long periods of time, and such compositions do not exhibit a tendency to discolor upon aging at room temperature, for several weeks. My new plasticizers are advantageous in the low water absorption of plastics containing these esters, being superior in this respect to commonly used plasticizers such as methylphthalyl ethyl glycolate and dimethyl phthalate.

My new plasticizers are particularly suitable for increasing the degree of fluidity of cellulose acetate compositions at elevated temperatures. This property is especially desirable in the manufacture of cellulose acetate plastics by means of injection molding, in which case the plasticizer employed should be capable of converting the cellulose acetate into a sufficiently fluid mass at molding temperatures to permit a rapid shaping of the material. The phthalates included by the above generic formula which are solids at ordinary temperatures have been found to be particularly useful in that they tend to produce harder plastics than the plasticizers which have been commonly incorporated into such compositions in the past. These solid esters are sufficiently good solvents at elevated temperatures to impart very satisfactory flow properties to such cellulose ester compositions without, at the same time, unduly softening the plastic at atmospheric temperature. These esters therefore constitute very satisfactory "hardening agents." The use of a plasticizer possessing these properties is particularly advantageous, since it greatly aids in the production of molded products having sharp definition, and, at the same time, a hard surface, resistant to scratching and marring.

In the preparation of lacquers, films, molding powders, etc., my plasticizers may be employed singly, in combination with one another, or in combination with one or more of the plasticizers previously used in such compositions. The quantity of ester employed will be determined chiefly by the desired characteristics of the product to be produced, and also upon the conditions to which the product will subsequently be subjected. For most purposes the phthalates may suitably be employed in amounts of approximately 20 to 70 per cent of the weight of the cellulose derivative, but I generally prefer to add such compounds in amounts of from 25 to 50 per cent of the weight of cellulose derivative.

In the case of cellulose derivative lacquers prepared with my new plasticizers, various solvents, diluents, pigments, and the like, may be employed in accordance with prior practices. The solvent mixture may vary widely in composition, and may comprise any of the usual combinations of solvents, latent solvents, and diluents. In formulating the solvent mixture, the usual precautions should, of course, be taken to ensure the presence of sufficient active solvent to prevent precipitation of the film-forming material at an undesirable stage in the evaporation of the solvent mixture.

Cellulose ester plastic compositions may be plasticized by incorporating the mixed phthalate in any suitable manner. For example the plasticizer may be added to a mixture of the cellulose ester and a solvent whose solvent power is insufficient to produce objectionable adhesive properties in such compositions. Methyl ethyl ketone or a 50-50 mixture of ethyl alcohol and acetone have been found to be solvents of this nature which are particularly suitable for cellulose acetate plastics. Pigments or dyes may also be added, if preferred. The mass of dough-like consistency, resulting from mixing the cellulose ester with the plasticizer solvent, may be sheeted out on heated rollers, and the solvent removed by evaporation or other convenient means. The sheets of plastic, thus obtained, may then be comminuted to give a product which is suitable for the production of molded plastics.

My invention may be further illustrated by the following specific examples:

*Example I*

A mixture of dough-like consistency was prepared by mixing in a dough mixer 100 parts by weight of cellulose acetate (combined acetic acid 52.9%; viscosity, 20% A. S. T. M., 52 sec.), 30 parts by weight of methyl ethyl ketone, 35 parts by weight of butyl 2-methyl-2-nitropropyl phthalate. The resulting mass, when thoroughly mixed, was run through extrusion rolls to form thin sheets. The solvent was then allowed to partially evaporate and the sheets resulting therefrom were broken into fine particles, and further dried for 12 hours in a well-ventilated oven at 65° C., giving a product suitable for use in the preparation of molded articles of any desired form.

*Example II*

A mixture of dough-like consistency was prepared by mixing in a dough mixer 150 parts by weight of cellulose acetate (combined acetic acid 55.8%; viscosity, 20% A. S. T. M., 40 sec.), 40 parts by weight of a solution consisting of a 50-50 mixture of acetone and ethyl alcohol, 40 parts by weight of methyl 2-methyl-2-nitropropyl phthalate, and 20 parts by weight of dimethyl phthalate. The resulting mass, when thoroughly mixed, was run through extrusion rolls to form thin sheets. The solvent was then allowed to evaporate, and the sheets resulting therefrom were ground into fine particles, giving a product suitable for the preparation of molded plastics.

*Example III*

A mixture of dough-like consistency was prepared by mixing in a dough mixer 150 parts by weight of cellulose acetate (combined acetic acid 54.2%; viscosity, 20% A. S. T. M., 52 sec.), 30 parts by weight of 2-nitro-2-methyl propyl phthalate, 60 parts by weight of methyl phthalyl-ethyl glycolate and 40 parts by weight of methanol. After thorough mixing the mass was sheeted out on rolls, the solvent allowed to evaporate, and the resulting dried material ground into a powder suitable for molding purposes.

Lacquers capable of forming tough, flexible films can be prepared in accordance with my invention and may be illustrated by the following specific examples:

*Example IV*

| Solids | Grams per 100 c. c. of solvents |
|---|---|
| Cellulose acetate (54-55% combined acetic acid; viscosity, 20% A. S. T. M., 2-8 sec.) | 15 |
| Dimethyl phthalate | 2 |
| Methyl 2-methyl-2-nitropropyl phthalate | 3 |

| Volatiles | Percent by volume |
|---|---|
| Acetone | 40 |
| Methyl lactate | 10 |
| Ethyl acetate | 30 |
| Absolute ethyl alcohol | 20 |

*Example V*

| Solids | Grams per 100 cc. of solvents |
|---|---|
| Nitrocellulose (½ second) | 10 |
| Ester gum | 10 |
| Methyl 2-methyl-2-nitrobutyl phthalate | 5 |

| Volatiles | Percent by volume |
|---|---|
| Butyl acetate | 20 |
| Ethyl acetate | 10 |
| Butyl alcohol | 10 |
| Ethyl alcohol | 10 |
| Toluol | 50 |

Although the above specific examples refer to nitrocellulose and cellulose acetate compositions, it is to be understood that I do not limit the scope of my invention to compositions of this nature, since my plasticizers are useful with any of the other cellulose derivatives, e. g., the cellulose esters and ethers of plastic and coating composition grades. Likewise, my invention is not limited to the particular nitroalcohol esters included in the specific examples, but includes all such esters of phthalic acid in the generic formulas previously discussed. In general, it may be said that any modifications of formulation of the cellulose derivative compositions, and the use of any equivalents which would naturally occur to one skilled in the art, are included within the scope of my invention.

My invention now having been described, what I claim is:

1. A composition of matter comprising a cellulose derivative selected from the group consisting of cellulose esters and ethers, and from 25%-50% by weight of a phthalic acid ester based on the weight of said cellulose derivative, said phthalic acid ester having the following structural formula:

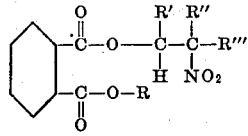

in which R' is chosen from the group consisting of hydrogen and alkyl, and R" and R'" are chosen from the group consisting of hydrogen, alkyl and cycloalkyl, and R is chosen from the group consisting of alkyl and cycloalkyl.

2. A composition of matter comprising a cellulose derivative selected from the group consisting of cellulose esters and ethers, and from 25%-50% by weight of a phthalic acid ester based on the weight of said cellulose derivative, said phthalic acid ester having the following structural formula:

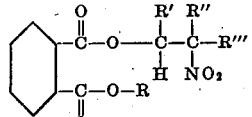

in which R' is chosen from the group consisting of hydrogen and an alkyl radical containing less than 6 carbon atoms, R" and R'" are chosen from the group consisting of hydrogen, alkyl and cycloalkyl, and R is chosen from the group consisting of alkyl and cycloalkyl radicals containing less than 6 carbon atoms.

3. A composition of matter comprising cellulose acetate, and 25%-50% by weight (based on the weight of the cellulose acetate) methyl 2-methyl-2-nitropropyl phthalate as a plasticizer for said cellulose acetate.

4. A composition of matter comprising cellulose acetate, and 25%-50% by weight (based on the weight of the cellulose acetate) ethyl 2-methyl-2-nitropropyl phthalate as a plasticizer for said cellulose acetate.

5. A composition of matter comprising cellulose acetate and 25%-50% by weight (based on the weight of the cellulose acetate) butyl 2-methyl-2-nitropropyl phthalate as a plasticizer for said cellulose acetate.

BYRON M. VANDERBILT.